(12) United States Patent
Grossnickle et al.

(10) Patent No.: US 9,759,547 B2
(45) Date of Patent: Sep. 12, 2017

(54) SYSTEMS AND METHODS FOR FIBER PLACEMENT INSPECTION DURING FABRICATION OF FIBER-REINFORCED COMPOSITE COMPONENTS

(71) Applicant: The Boeing Company, Huntington Beach, CA (US)

(72) Inventors: James A. Grossnickle, Bellevue, WA (US); Kevin Earl McCrary, Puyallup, WA (US); Karl M. Nelson, Seattle, WA (US); Craig Allen Cramer, Bothell, WA (US)

(73) Assignee: The Boeing Company, Chicago, IL (US)

( * ) Notice: Subject to any disclaimer, the term of this patent is extended or adjusted under 35 U.S.C. 154(b) by 507 days.

(21) Appl. No.: 14/463,433

(22) Filed: Aug. 19, 2014

(65) Prior Publication Data
US 2016/0102966 A1    Apr. 14, 2016

(51) Int. Cl.
*G01B 11/06* (2006.01)
*B29C 70/38* (2006.01)
(Continued)

(52) U.S. Cl.
CPC ............ *G01B 11/06* (2013.01); *B29C 70/382* (2013.01); *G06T 7/001* (2013.01); *G06T 7/0057* (2013.01);
(Continued)

(58) Field of Classification Search
None
See application file for complete search history.

(56) References Cited

U.S. PATENT DOCUMENTS

| 6,885,444 B2 * | 4/2005 | Borden ................. G01N 21/171 257/E21.53 |
| 2002/0034324 A1 * | 3/2002 | Beaty .................... G06T 7/0002 382/145 |

(Continued)

FOREIGN PATENT DOCUMENTS

| EP | 2749869 | 7/2007 |
| EP | 1810816 | 7/2014 |
| IL | EP 2749869 A1 * | 7/2014 ............. B29C 70/38 |

OTHER PUBLICATIONS

Herbst et al, "Basics of 3D Digital Image Correlation", Jan. 13, 2014, Dantec Dynamics, pp. 1-4.*
(Continued)

*Primary Examiner* — Kara E Geisel
*Assistant Examiner* — Amanda Merlino
(74) *Attorney, Agent, or Firm* — DASCENZO Intellectual Property Law, P.C.

(57) ABSTRACT

The disclosed systems and methods relate to inspecting uncured fiber-reinforced composite components by non-contact 3D measurements of the component using 3D digital image correlation with patterned illumination. Systems comprise a light projector configured to project a light pattern onto a form, a digital camera configured to image the light pattern, and may comprise and/or be associated with an AFP machine that is configured to lay uncured composite on the form. Methods comprise projecting a light pattern onto a form, acquiring a baseline 3D profile of the form by imaging the light pattern on the form, laying an uncured fiber piece onto the form, projecting the light pattern onto the uncured fiber piece, acquiring a test 3D profile of the fiber piece by imaging the light pattern on the uncured fiber piece, and computing a thickness difference between the test 3D profile and the baseline 3D profile.

20 Claims, 2 Drawing Sheets

(51) Int. Cl.
 G06T 7/00 (2017.01)
 B29C 37/00 (2006.01)
 B32B 5/02 (2006.01)
 B32B 5/26 (2006.01)
(52) U.S. Cl.
 CPC ......... B29C 2037/906 (2013.01); B32B 5/026 (2013.01); B32B 5/26 (2013.01); B32B 2260/021 (2013.01); B32B 2260/046 (2013.01); B32B 2262/0261 (2013.01); B32B 2262/101 (2013.01); B32B 2262/106 (2013.01); G06T 2207/10028 (2013.01)

(56) References Cited

U.S. PATENT DOCUMENTS

2007/0044922 A1* 3/2007 Mischler ............... B29C 70/382
 156/574
2011/0017380 A1 1/2011 Engelbart et al.
2013/0228285 A1* 9/2013 Pause ..................... B29C 70/38
 156/360

OTHER PUBLICATIONS

Tyson et al., "Optical Deformation & Strain Measurement in Biomechanics," Biophotonics, Sep. 2003, article downloaded from www.gom.com/fileadmin/user_upload/industries/biomechanics_2003.pdf on Jul. 1, 2014.

"Application Example: Material Testing, Numerical Simulation: Complete deformation measurement using multiple Aramis sensors," downloaded from www.gom.com/fileadmin/user_upload/industries/multi_aramis_EN.pdf on Jul. 1, 2014.

European Patent Office, Extended European Search Report for related European Patent Application No. 15172955, dated Feb. 1, 2016.

* cited by examiner

SYSTEMS AND METHODS FOR FIBER PLACEMENT INSPECTION DURING FABRICATION OF FIBER-REINFORCED COMPOSITE COMPONENTS

FIELD

The present disclosure relates to systems and methods for fiber placement inspection during fabrication of fiber-reinforced composite components.

BACKGROUND

Automated fiber placement is a technique of manufacturing fiber-reinforced composite components. The technique uses automated fiber placement (AFP) machines (also called advanced fiber placement machines) that precisely place and layer strips of uncured fiber tape onto molds and/or mandrels. AFP machines typically are used to fabricate large-scale, complex-shaped structures such as airframes, air turbine blades, pressure vessels, and other industrial products.

The uncured fiber tape commonly includes carbon fibers pre-impregnated with thermoset and/or thermoplastic materials (a prepreg carbon fiber tape). The tape may be in the form of a tow, which is an untwisted bundle of continuous filaments, and may be thin and narrow (common thicknesses range from about 0.005" (0.13 mm) to 0.010" (0.25 mm); common widths range from about 0.125" (3 mm) to about 0.5" (13 mm)).

AFP machines typically have a capacity to place a plurality (e.g., 2-32) of strips of tape together in parallel and thus may form a single band with a width as wide as the sum of the widths of the strips. AFP machines may place the strips in a range of orientations (e.g., 0°, +45°, −45°, and/or 90°) across a range of layup mold and/or mandrel shapes (e.g., flat, concave, and/or convex). Machines limited to essentially flat or basic contours may be referred to as automated tape laying machines, automated flat tape laying machines, and/or automated contour tape laying machines.

AFP machines typically include automated cutting of the tape into strips and layering of the strips to form plies (each a single strip layer). Further, AFP machines may compact new strip layers onto the underlying plies. The layers of a composite part need to properly contact and adhere to each other for proper lamination and cure. Where new strip layers fail to adhere to the underlying layers (with or without AFP machine compacting), inter-laminar voids form in the uncured and cured part. Inter-laminar voids are a delamination defect that may lead to weakness in the cured composite part. Hence, there is a need to detect and repair inter-laminar voids, preferably before curing a composite part.

SUMMARY

Systems and methods disclosed herein relate to inspecting uncured fiber-reinforced composite components by non-contact 3D (three dimensional) measurements of the surface of an at least partially formed, uncured, fiber-reinforced composite component using the technique of 3D digital image correlation with patterned illumination.

Systems for inspecting comprise a light projector configured to project a light pattern onto a form at an inspection area, a digital camera configured to image the light pattern on the form, and a computing system programmed to project the light pattern, to acquire images, and to determine a 3D profile from the acquired images. More specifically, the computing system may be programmed to perform any of the methods described herein.

Systems for inspecting are configured to determine a baseline 3D profile of the form, to determine a test 3D profile of an uncured fiber-reinforced composite layered on the form, and to determine a thickness difference between the test 3D profile and the baseline 3D profile. Systems for inspecting may be associated with and/or may include an AFP machine that is configured to lay the uncured fiber-reinforced composite on the form.

Methods for inspecting comprise inspecting before, during, and/or after the fabrication of the uncured fiber-reinforced composite component. Methods for inspecting comprise projecting a light pattern onto an inspection area on a form, acquiring a baseline 3D profile of the form by imaging the light pattern on the form, laying an uncured fiber piece (e.g., a strip, a sheet) onto the form within the inspection area, projecting the light pattern onto the uncured fiber piece on the form, acquiring a test 3D profile of the fiber piece on the form by imaging the light pattern on the uncured fiber piece on the form, and computing a thickness difference between the test 3D profile and the baseline 3D profile.

DESCRIPTION

Systems and methods for inspection of fiber placement during fabrication of fiber-reinforced composite components are disclosed herein. In general, in the drawings, elements that are likely to be included in a given embodiment are illustrated in solid lines, while elements that are optional or alternatives are illustrated in dashed lines. However, elements that are illustrated in solid lines are not essential to all embodiments of the present disclosure, and an element shown in solid lines may be omitted from a particular embodiment without departing from the scope of the present disclosure.

Figure 1:
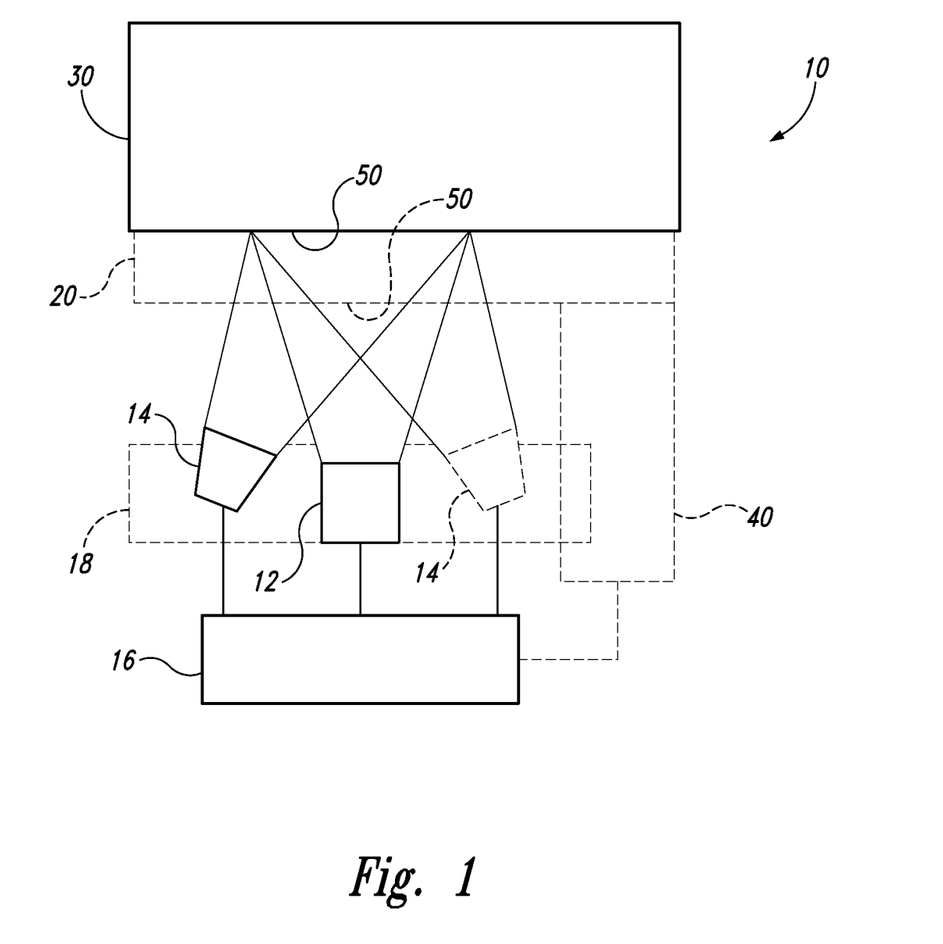
FIG. 1 is a schematic representation of a fiber placement inspection system.

FIG. 1 schematically represents a fiber placement inspection system 10. Systems 10 may be configured to inspect uncured fiber-reinforced composite components 20 such as components at least partially formed by an AFP machine 40.

At a general level, systems 10 are configured to perform non-contact 3D measurements of the surface of an at least partially formed, uncured, fiber-reinforced composite component 20 using the technique of 3D digital image correlation with patterned illumination rather than inherent and/or applied surface markings. Systems 10 may be further configured to measure the 3D profile (also called the 3D surface profile) before, during, and/or after the fabrication of the component 20, optionally measuring the 3D profile of the underlying form 30 and one or more layers of the component 20, and/or optionally determining the (apparent) thickness of the one or more layers (the thickness may be average layer(s) thickness and/or may be the thickness at one or more points across the layer). Systems 10 may be configured to automatically detect inter-laminar voids between layers (i.e., delamination defects) of the uncured fiber-reinforced composite component 20 (e.g. by detecting anomalous thicknesses and/or 3D profiles).

Systems 10 comprise a light projector 12 configured to project a light pattern onto a form 30 at an inspection area 50, a digital camera 14 configured to image the light pattern on the form 30, and a computing system 16 programmed to project the light pattern, to acquire images, and to determine a 3D profile from the acquired images. More specifically, the computing system 16 may be programmed to perform any of the methods described herein.

Uncured fiber-reinforced composite components 20 are fiber-reinforced composite structures prior to being completely cured, i.e., the components 20 are in an uncured and/or partially cured state. Example fiber-reinforced structures include aerospace structures and/or constituents, aircraft, airframes, fuselages, wings, airfoils, rotor blades, wind turbine structures and/or constituents, automotive structures and/or constituents, watercraft structures and/or constituents, and/or any other fiber-reinforced composite structures. Systems 10 may be configured to inspect and/or detect relatively large components 20, for example components 20 with a surface area of greater than 1 $m^2$ (square meter), greater than 2 $m^2$, greater than 5 $m^2$, greater than 10 $m^2$, greater than 20 $m^2$, greater than 50 $m^2$, less than 100 $m^2$, less than 50 $m^2$, less than 20 $m^2$, and/or less than 10 $m^2$. Components 20 typically are laminated structures formed of at least one ply, layer, and/or lamina. Each ply, layer, and/or lamina may include at least one fiber piece (i.e., a strip, sheet, and/or tow of fiber-reinforced material). Components 20 may include at least one band and/or course of fiber pieces. Components 20, plies, layers, laminae, fiber pieces, bands, and/or courses may be thin, e.g., with a thickness of less than 20 mm, less than 10 mm, less than 6 mm, less than 5 mm, less than 3 mm, less than 2 mm, less than 1 mm, less than 0.5 mm, less than 0.2 mm, less than 0.1 mm, less than 0.05 mm, greater than 0.01 mm, greater than 0.02 mm, greater than 0.05 mm, greater than 0.1 mm, greater than 0.2 mm, greater than 0.5 mm, greater than 1 mm, greater than 2 mm, and/or greater than 5 mm. Fiber pieces may be relatively narrow, e.g., with a width of less than 40 mm, less than 20 mm, less than 10 mm, less than 6 mm, less than 5 mm, less than 3 mm, less than 2 mm, less than 1 mm, greater than 1 mm, greater than 2 mm, greater than 5 mm, greater than 10 mm, about 3 mm, about 6 mm, and/or about 13 mm.

Fiber-reinforced material includes reinforcement fibers such as carbon fiber, glass fiber, and/or polyamide fiber. The fibers may be in the form of a tow, a weave, a knit, a fabric, and/or a felt. Fiber-reinforced material may include a resin such as an epoxy, a thermoset material, and/or a thermoplastic material. When fiber-reinforced material includes a resin it may be referred to as a prepreg material.

Systems 10 may comprise the form 30. Forms 30 are structures that provide a surface shape for the uncured fiber-reinforced composite component 20 as the component 20 is being formed, cured, and/or finished. For example, forms 30 may be configured to facilitate the fabrication of the component 20. Forms 30 may include, and/or may be, a mandrel, a mold, and/or a tool. Further, forms 30 may be at least partially covered by, and/or may include, at least a portion of the component 20 (e.g., one or more plies, courses, layers, and/or laminae of uncured fiber pieces of the component 20). The inspection area 50 is associated with at least a portion of the form 30. Generally, the inspection area 50 is a surface region of the form 30, the surface being defined by the form 30 (which may include at least a portion of the component 20).

Systems 10 may be associated with and/or may comprise the AFP machine 40. Additionally or alternatively, the AFP machine 40 may be configured to layer uncured fiber-reinforced composites (e.g., fiber pieces) onto the form 30 and/or within the inspection area 50.

Light projectors 12 of systems 10 are configured to project a light pattern onto the inspection area 50 on the form 30. Light projectors 12 may include a lamp, an LED, a laser, a diffractive beam splitter, a diffractive optic, and/or a laser scanner. The projected light pattern is a pattern configured to be detected by the digital camera(s) 14. Light patterns are high contrast patterns, with contrast between regions of the pattern due to variations in brightness, spectrum (e.g., color), and/or polarization. Light patterns may be regular (e.g., repeating) patterns, non-regular patterns, stochastic (e.g., random or pseudo-random) patterns, images, arrays of spots, and/or grids. Light patterns may repeat in one and/or two dimensions. As used herein, light refers to electromagnetic radiation within the ultraviolet, visible, and/or infrared region. High contrast patterns may have a local and/or global high contrast resolution (the ratio of the difference between the maximum brightness and the minimum brightness to the average brightness). Suitable high contrast resolutions include greater than 0.5, greater than 0.8, greater than 1, greater than 1.2, and/or greater than 1.5.

Generally, light patterns include bright patches bounded by dim patches, although, in some embodiments, dim patches may be bounded by bright patches. Non-circular patches, spots, dots, and/or other light structures within the light pattern have at least a major dimension and a minor dimension. For circular structures, the major dimension and the minor dimension are the same. The major dimension is the longest dimension of a bounding box (i.e., rectangle) that circumscribes the light structure. The minor dimension is the shortest dimension of the bounding box. The average minor dimension of light structures within a light pattern may be less, and optionally substantially less, than a width of an uncured fiber piece (e.g., strip, sheet) of the uncured fiber-reinforced composite component 20. For example, the average minor dimension may be less than 12 mm, less than 10 mm, less than 7 mm, less than 5 mm, less than 3 mm, less than 2 mm, less than 1 mm, greater than 1 mm, greater than 2 mm, greater than 3 mm, greater than 5 mm, greater than 7 mm, greater than 10 mm, and/or greater than 12 mm.

Whatever the form of the pattern, light patterns are configured to illuminate the surface at the inspection area 50 (e.g., the form 30 and/or the composite 20 at least partially layered over the form 30). Moreover, light projectors 12 and/or light patterns may be configured to repeatedly replicate the same pattern at the inspection area 50 (e.g., projecting the same light pattern for every 3D profile measurement). Additionally or alternatively, light projectors 12 may be configured to project different light patterns with deterministic differences.

Digital cameras 14 of systems 10 are configured to image the inspection area 50 when illuminated by the light projector 12. Systems 10 may comprise one or more digital cameras 14. Each digital camera 14 is configured to acquire a 2D (two dimensional) image of the inspection area 50 (which may include the form 30 and/or the component 20), i.e., the field of view of each digital camera 14 encompasses the inspection area 50 and each digital camera 14 is focused on the inspection area 50. Digital cameras 14 may include an electronic image sensor (such as a CMOS sensor and/or CCD sensor) and a lens. Moreover, digital cameras 14 are configured to respond to the light pattern projected onto the inspection area 50 by the light projector 12, e.g., the lens and the image sensor are sensitive to light from the light pattern.

Where systems 10 comprise one digital camera 14, the digital camera 14 is configured to move between different perspectives (i.e., different points of view) of the inspection area 50 and/or the form 30. For systems 10 which comprise two or more digital cameras 14, each digital camera 14 may be independently configured to move between different perspectives. Additionally or alternatively, two or more digital cameras 14 may be configured to move together, maintaining a constant relative perspective, spacing, and/or orientation as the digital cameras 14 are moved together. Where digital cameras 14 are configured to move, the digital camera positions may be indexed, tracked, and/or indicated, and/or the motion of the digital cameras 14 may be automated, driven, and/or commanded, to achieve a consistent repositioning of the digital camera(s) 14. To facilitate repeated motion, accurate positioning and/or orientation, precision positioning and/or orientation, stable perspectives, and/or rigid coupling, systems 10 may comprise a frame 18. Frames 18 may include a mount, a yoke, a rail, a tripod, a stage, and/or a positioner. Frames may be coupled to and/or may be a portion of the AFP machine 40.

Where systems 10 comprise two or more digital cameras 14, at least two of the digital cameras 14 have a different perspective of the inspection area 50 and/or the form 30. The digital cameras 14 and/or the computing system 16 may be configured (and/or programmed) to acquire images sequentially (i.e., one digital camera image at a time), asynchronously, synchronously, and/or at least partially concurrently.

Computing systems 16 of systems 10 may be and/or may include a controller, an electronic controller, a dedicated controller, a special-purpose controller, a general-purpose computer, a special-purpose computer, a display device, a logic device, and/or a memory device. The memory device, when present, may include non-transitory computer-readable media and may store computer-executable instructions for implementing aspects of systems 10 and/or methods 100 (as represented in FIG. 2).

Figure 2:
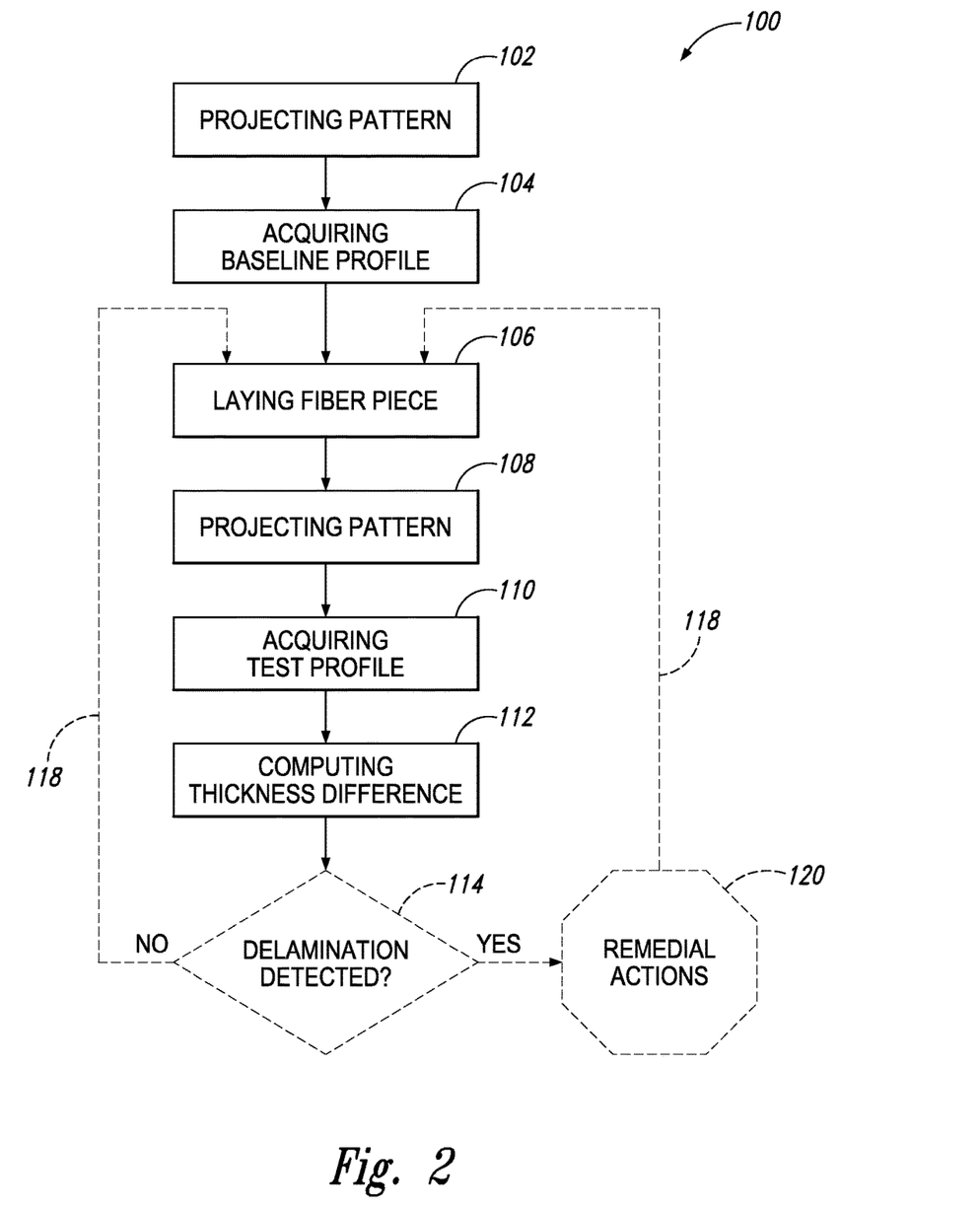
FIG. 2 is a schematic representation of methods for fiber placement inspection.

FIG. 2 schematically represents methods 100 for inspecting uncured fiber-reinforced composite components (e.g., uncured fiber-reinforced composite components 20). Such components may be at least partially formed by an AFP machine 40 and/or may be inspected before, during, and/or after the fabrication of the component. Methods 100 are methods to perform non-contact 3D measurements of the surface of an at least partially formed, uncured, fiber-reinforced composite component using the technique of 3D digital image correlation with patterned illumination rather than inherent and/or applied surface markings. Methods 100 may be methods to measure the 3D profile before, during, and/or after the fabrication of the component, optionally measuring the 3D profile of the underlying form (e.g., form 30) and one or more layers of the component, and/or optionally determining the thickness of the one or more layers (e.g., the thickness or thicknesses at one or more points across the layer(s)). Methods 100 may be methods of automatic detection of inter-laminal voids between layers (i.e., delamination defects) of the uncured fiber-reinforced composite component (e.g. by detecting anomalous thicknesses and/or 3D profiles).

Methods 100 comprise projecting 102 a light pattern onto an inspection area (e.g., inspection area 50) on a form (e.g., form 30), acquiring 104 a baseline 3D profile of the form by imaging the light pattern on the form, laying 106 an uncured fiber piece (e.g., a strip, a sheet) onto the form within the inspection area, projecting 108 the same light pattern onto the uncured fiber piece on the form, acquiring 110 a test 3D profile of the fiber piece on the form by imaging the light pattern on the uncured fiber piece on the form, and computing 112 a thickness difference between the test 3D profile and the baseline 3D profile. The thickness difference may be, may be a portion of, and/or may be derived from, a thickness profile, i.e., the displacement of a plurality of common nodes between the test 3D profile and the baseline 3D profile.

Projecting 102 (and the concurrent acquiring 104) is performed before laying 106 and before projecting 108 (and the concurrent acquiring 110). The combination of projecting 102 and acquiring 104 results in the computation of a baseline 3D profile, i.e., a 3D profile of the form before laying 106. Projecting 102 and acquiring 104 may be performed before any uncured fiber piece is laid, adhered, and/or placed on the form (a bare form). Additionally or alternatively, projecting 102 and acquiring 104 may be performed during and/or after one or more uncured fiber pieces are laid, adhered to, and/or placed on the bare form (in which case the form may include the bare form and the fiber pieces).

Projecting 102 and the subsequent projecting 108 project the same light pattern onto the respective targets of the projecting, i.e., the form for projecting 102 and the uncured fiber piece on the form for projecting 108. Generally, projecting 102 and projecting 108 are performed in the same manner except separated in time and with a different target illuminated by the light pattern. Projecting 102 and/or projecting 108 may include operating a light projector (e.g., light projector 12). Projecting 102 and/or projecting 108 may include focusing an image of the light pattern onto the respective targets. Additionally or alternatively, projecting 102 and/or projecting 108 may include projecting and/or scanning a bright point of light (or a plurality of bright points of light) onto the respective targets. The bright spot(s) may include collimated and/or focused light. For example, the bright spot(s) may be a laser spot, a diffracted spot, a refracted spot, and/or a reflected spot.

Acquiring 104 and the subsequent acquiring 110 acquire images of the light pattern (projected by projecting 102 and projecting 108 respectively) on the respective targets of the imaging, i.e., the form for acquiring 104 and the uncured fiber piece on the form. Generally, acquiring 104 and acquiring 110 are performed in the same manner except separated in time and with a different target imaged. Acquiring 104 and/or acquiring 110 may include performing digital image correlation, full-field 3D image correlation, photogrammetry, and/or triangulation based upon two or more images of the respective targets acquired from different perspectives. The two or more images may be acquired with one or more digital cameras (e.g., digital camera 14), with the different perspectives corresponding to different positions of the digital camera(s). In particular in methods using fewer digital cameras than images acquired for the acquiring 104 and/or the acquiring 110, acquiring 104 and/or acquiring 110 may include changing the relative positions of the digital camera(s), the light projector, and/or form. Acquiring 104 and/or acquiring 110 each may include sequentially, at least partially concurrently, and/or substantially simultaneously acquiring the two or more images.

Acquiring 104 and/or acquiring 110 use the images acquired to compute 3D profiles of the respective targets, i.e., a baseline 3D profile of the form prior to laying 106 the uncured fiber piece and a test 3D profile of the uncured fiber piece on the form. A 3D profile is a digital description of the real surface of the respective target. 3D profiles may be in the form of a 3D surface model, a 3D polygonal mesh, a point cloud, a 3D wireframe, and/or a 3D topology. Computing 3D profiles may include correlating, and/or calculating a correlation coefficient of, a first image of the light pattern on the respective target from a first position and a second image of the light pattern on the respective target from a second position. Computing 3D profiles may include calculating and/or using a perspective map that represents differences in perspective between at least two of the images acquired.

Methods 100 comprise laying 106, which is performed after acquiring 104 and which at least begins before acquiring 110. Laying 106, also referred to as layering, may be performed with an AFP machine (e.g., AFP machine 40) and may include laying a plurality of uncured fiber pieces in at least one layer, ply, lamina, and/or course on the form (and/or the bare form with previously laid fiber piece(s)). The uncured fiber piece may be one of a series of uncured fiber pieces, e.g., a portion of a layer, ply, lamina, and/or course, and methods 100 may comprise laying 106 each of the series of uncured fiber pieces. Layering the series of uncured fiber pieces in this manner may include forming a first layer, ply, lamina, and/or course that includes at least one of the series of uncured fiber pieces and forming a second layer, ply, lamina, and/or course that includes at least one (generally a different one) of the series of uncured fiber pieces. When layering, each new layer, ply, lamina, and/or course is placed in contact with the previous layer, ply, lamina, and/or course.

Laying 106 may be performed at least partially concurrently with projecting 108 and/or acquiring 110. For example, laying 106 may be a process of laying a series of layers, plies, laminae, and/or courses. Projecting 108 and/or acquiring 110 may be performed between the laying of each layer, ply, lamina, and/or course. Additionally or alternatively, laying 106 may be limited to laying one or more layers, plies, laminae, and/or courses of a series of such and methods 100 may include repeating 118 the laying 106, projecting 108, acquiring 110, and/or the computing 112 until all layers, plies, laminae, and/or courses of the series are complete or the process is stopped as described further herein.

Methods 100 comprise computing 112 the thickness difference between the test 3D profile and the baseline 3D profile, after and/or during laying 106 as described herein, and after acquiring 110 the test 3D profile. Computing 112 may include computing and/or determining a thickness difference at a single point and/or a single region within the inspection area (optionally a thickness difference representing the entire inspection area). Additionally or alternatively, computing 112 may include computing and/or determining a plurality of thickness differences, each corresponding to a point within the inspection area, a region within the inspection area, and/or the entire inspection area. The points and/or regions may be arranged across the inspection area such as in an array, a grid, a mesh, etc. Computing 112 may further include comparing the thickness difference and/or at least one, optionally each, of the thickness differences to a predetermined threshold and/or determining that the compared thickness difference is greater than, equal to, substantially equal to, and/or less than the predetermined threshold. The predetermined threshold may be a value thicker than a fiber piece and thinner than an anomaly in the uncured fiber-reinforce composite component such as a delamination defect. For example, the predetermined threshold may be greater than 0.01 mm, greater than 0.02 mm, greater than 0.05 mm, greater than 0.1 mm, greater than 0.2 mm, greater than 0.5 mm, greater than 1 mm, greater than 2 mm, greater than 5 mm, less than 0.05 mm, less than 0.1 mm, less than 0.2 mm, less than 0.5 mm, less than 1 mm, less than 2 mm, less than 5 mm, about 3 mm, about 6 mm, and/or about 10 mm.

Computing 112 may include computing the thickness difference between one test 3D profile and another test 3D profile as may have been acquired for a previously laid fiber piece. That is, when repeating 118 and/or when performing the methods 100 for a series of fiber pieces, computing 112 may include computing the thickness difference and/or thickness differences between the first test 3D profile and the baseline 3D profile, and subsequent computing 112 may include computing the thickness difference and/or thickness differences between the current test 3D profile and a prior (e.g., the immediately prior) test 3D profile of a fiber piece laid in the same overall process.

Methods 100 may include determining that the thickness difference and/or thickness differences computed in the computing 112 is greater than, equal to, substantially equal to, and/or less than the predetermined threshold and acting upon that determination. In FIG. 2, this decision is indicated by 114 and schematically represented by the question "Delamination detected?" However, decision 114 may be simply a decision point in the process flow of methods 100, based upon the computed thickness difference(s) and the predetermined threshold. Decision 114 may represent, for example, a quality control step, a verification step, and/or a measurement step. Decision 114 may lead to ceasing, continuing, and/or modifying the inspection process. Further, decision 114 may lead to remedial actions 120. For example, remedial actions 120 may include alerting an inspector, operator, and/or control system (e.g., computing system 16) of an acceptable fiber piece placement, an unacceptable fiber piece placement, the presence of an inter-laminal void, the absence of an inter-laminal void, and/or the extent of an inter-laminal void. Also, remedial actions 120 may include compacting, vacuum bagging, compressing, and/or heating the fiber piece(s) and/or the at least partially complete uncured fiber-reinforced composite component. Remedial actions may be performed to repair a defect in the uncured fiber-reinforced composite component (such as a delamination defect) while avoiding unnecessary curing of the composite component. For example, heating may be to a temperature that is less than the cure temperature of the uncured fiber piece and/or the uncured fiber-reinforced composite component. Suitable temperatures may be less than 40° C., less than 50° C., less than 70° C., less than 100° C., less than 120° C., less than 150° C., less than 175° C., greater than 30° C., greater than 40° C., greater than 50° C., and/or greater than 70° C. After remedial actions 120, methods 100 may be ceased, continued, and/or modified.

Illustrative, non-exclusive examples of inventive subject matter according to the present disclosure are described in the following enumerated paragraphs.

A1. An inspection method comprising:

projecting, optionally initially projecting, a first light pattern onto an inspection area on a form;

acquiring a baseline 3D profile of the form by imaging the first light pattern on the form;

laying an uncured fiber piece onto the form within the inspection area;

projecting, optionally subsequently projecting, a second light pattern onto the uncured fiber piece on the form;

acquiring a test 3D profile of the fiber piece on the form by imaging the second light pattern on the uncured fiber piece on the form; and computing a thickness difference between the test 3D profile and the baseline 3D profile.

A1.1. The method of paragraph A1, wherein the first light pattern and the second light pattern are the same.

A1.2. The method of any of paragraphs A1-A1.1, wherein the first light pattern is related to the second light pattern in a deterministic manner.

A2. The method of any of paragraphs A1-A1.2, wherein the inspection method is a method for automated detection of inter-laminal voids between lamina of an uncured fiber-reinforced composite.

A3. The method of any of paragraphs A1-A2, wherein the inspection method is a method for automated detection of uncured fiber-reinforced composite component thickness.

A4. The method of any of paragraphs A1-A3, wherein the inspection method is a method for automated detection of inter-laminal voids during fabrication of a fiber-reinforced composite component, optionally wherein the fiber-reinforced composite component is at least a portion of at least one of an aircraft, an airframe, a fuselage, a wing, an aerospace structure, an airfoil, a rotor blade, a wind turbine structure, an automotive structure, and a watercraft structure.

A5. The method of any of paragraphs A1-A4, further comprising detecting a void between the uncured fiber piece and the form.

A6. The method of any of paragraphs A1-A5, further comprising not detecting a void between the uncured fiber piece and the form.

A7. The method of any of paragraphs A1-A6, further comprising detecting no void between the uncured fiber piece and the form.

A8. The method of any of paragraphs A1-A7, wherein the form includes, and optionally is, at least one of a mandrel, a mold, a tool, and a ply of uncured fiber pieces.

A9. The method of any of paragraphs A1-A8, wherein the first light pattern and/or the second light pattern is a high contrast pattern.

A10. The method of any of paragraphs A1-A9, wherein the first light pattern and/or the second light pattern is a regular pattern, a non-regular pattern, and/or a stochastic pattern.

A11. The method of any of paragraphs A1-A10, wherein the first light pattern and/or the second light pattern is at least one of an array of spots, a grid, an image, a repeating pattern, and a two-dimensionally repeating pattern.

A12. The method of any of paragraphs A1-A11, wherein the first light pattern and/or the second light pattern includes bright patches bounded by dim patches.

A12.1. The method of paragraph A12, wherein an average minor dimension of the bright patches and/or an average minor dimension of the dim patches is less than 12 mm, less than 10 mm, less than 7 mm, less than 5 mm, less than 3 mm, less than 2 mm, less than 1 mm, greater than 1 mm, greater than 2 mm, greater than 3 mm, greater than 5 mm, greater than 7 mm, greater than 10 mm, and/or greater than 12 mm.

A12.2. The method of any of paragraphs A12-A12.1, wherein an average minor dimension of the bright patches and/or an average minor dimension of the dim patches is less than a width of the uncured fiber piece.

A12.3. The method of any of paragraphs A12-A12.2, wherein the bright patches include a first color and the dim patches include a second color.

A13. The method of any of paragraphs A1-A12.3, wherein the projecting the first light pattern onto a form includes illuminating the form with the first light pattern.

A14. The method of any of paragraphs A1-A13, wherein the projecting the second light pattern onto the uncured fiber piece on the form includes illuminating the uncured fiber piece on the form with the second light pattern.

A15. The method of any of paragraphs A1-A14, wherein the projecting the first light pattern onto a form includes focusing an image of the first light pattern on the form.

A16. The method of any of paragraphs A1-A15, wherein the projecting the second light pattern onto the uncured fiber piece on the form includes focusing an image of the second light pattern on the uncured fiber piece on the form.

A17. The method of any of paragraphs A1-A16, wherein the projecting the first light pattern onto a form includes scanning a bright point of light across the form to generate the first light pattern, optionally wherein the bright point is a laser spot.

A18. The method of any of paragraphs A1-A17, wherein the projecting the second light pattern onto the uncured fiber piece on the form includes scanning a bright point of light across the uncured fiber piece on the form to generate the second light pattern, optionally wherein the bright point is a laser spot.

A19. The method of any of paragraphs A1-A18, wherein the acquiring the baseline 3D profile includes acquiring at least two baseline images of the first light pattern on the form, and optionally wherein the acquiring the baseline 3D profile includes computing the baseline 3D profile of the form from the baseline images.

A20. The method of any of paragraphs A1-A19, wherein the acquiring the test 3D profile includes acquiring at least two test images of the second light pattern on the uncured fiber piece on the form, and optionally wherein the acquiring the test 3D profile includes computing the test 3D profile of the form from the test images.

A21. The method of any of paragraphs A1-A20, wherein the acquiring the baseline 3D profile and/or the acquiring the test 3D profile includes imaging, optionally substantially simultaneously imaging, with two digital cameras with different perspectives, the first light pattern on the form and/or the second light pattern on the uncured fiber piece on the form.

A22. The method of any of paragraphs A1-A21, wherein the acquiring the baseline 3D profile and/or the acquiring the test 3D profile includes imaging the first light pattern on the form and/or the second light pattern on the uncured fiber piece on the form from a first position and imaging the first light pattern on the form and/or the second light pattern on the uncured fiber piece on the form from a second position.

A23. The method of any of paragraphs A1-A22, wherein the acquiring the baseline 3D profile and/or the acquiring the test 3D profile includes acquiring two images, each from a different perspective, of the first light pattern on the form and/or the second light pattern on the uncured fiber piece on the form.

A24. The method of any of paragraphs A1-A23, wherein the acquiring the baseline 3D profile and/or the acquiring the test 3D profile includes performing at least one of full-field 3D image correlation, digital image correlation, photogrammetry, and triangulation.

A25. The method of any of paragraphs A1-A24, wherein the acquiring the baseline 3D profile and/or the acquiring the test 3D profile includes correlating, and/or calculating a correlation coefficient of, a first image of the first light pattern on the form and/or the second light pattern on the uncured fiber piece on the form from a first position and a second image of the first light pattern on the form and/or the second light pattern on the uncured fiber piece on the form from a second position.

A26. The method of any of paragraphs A1-A25, wherein the acquiring the baseline 3D profile and/or the acquiring the test 3D profile includes calculating a perspective map that represents differences in perspective between two images, each from a different perspective, of the first light pattern on the form and/or the second light pattern on the uncured fiber piece on the form.

A27. The method of any of paragraphs A1-A26, wherein the uncured fiber piece is a strip, a sheet, and/or a tow of fiber-reinforced material.

A28. The method of any of paragraphs A1-A27, wherein the uncured fiber piece is at least one of a carbon fiber piece, a glass fiber piece, and a polyamide fiber piece.

A29. The method of any of paragraphs A1-A28, wherein the uncured fiber piece is a prepreg fiber piece.

A30. The method of any of paragraphs A1-A29, wherein the uncured fiber piece includes at least one of carbon fiber, glass fiber, polyamide fiber, epoxy, a thermoplastic material, and a thermoset material.

A31. The method of any of paragraphs A1-A30, wherein the uncured fiber piece is at least a portion of at least one of a band of uncured fiber pieces, a course of uncured fiber pieces, a layer of uncured fiber pieces, a lamina of uncured fiber pieces, and a ply of uncured fiber pieces.

A32. The method of any of paragraphs A1-A31, wherein the laying includes laying a plurality of uncured fiber pieces in a single layer on the form.

A33. The method of any of paragraphs A1-A32, wherein the laying includes laying a plurality of layers of uncured fiber pieces.

A34. The method of any of paragraphs A1-A33, wherein the uncured fiber piece is one of a series of uncured fiber pieces, and the method further comprises layering the series of uncured fiber pieces onto the form.

A34.1. The method of paragraph A34, wherein the layering includes the laying of one of the series of uncured fiber pieces onto the form.

A34.2. The method of any of paragraphs A34-A34.1, wherein the layering includes forming a first layer including at least one of the series of uncured fiber pieces and forming a second layer contacting the first layer, wherein the second layer includes at least one of the series of uncured fiber pieces.

A34.3. The method of any of paragraphs A34-A34.2, further comprising, upon determining that the thickness difference is greater than, equal to, substantially equal to, and/or less than a predetermined threshold, ceasing the layering.

A34.4. The method of any of paragraphs A34-A34.3, further comprising repeating, for each layer including one of the series of uncured fiber pieces, the laying, the projecting the second light pattern onto the uncured fiber piece, and the acquiring the test 3D profile of the uncured fiber piece.

A34.4.1. The method of paragraph A34.4, wherein the laying includes laying one of the series of uncured fiber pieces on a prior layer that includes another of the series of uncured fiber pieces.

A34.4.2. The method of any of paragraphs A34.4-A34.4.1, wherein the repeating includes repeating the computing the thickness difference between the test 3D profile and the baseline 3D profile.

A34.4.3. The method of any of paragraphs A34.4-A34.4.2, wherein the repeating includes repeating computing a thickness difference between the test 3D profile of one of the series of uncured fiber pieces and the test 3D profile of another of the series of uncured fiber pieces.

A35. The method of any of paragraphs A1-A34.4.3, wherein the computing includes computing a thickness difference between the test 3D profile and the baseline 3D profile at a single point and/or a single region within the inspection area, optionally wherein the single region is the inspection area.

A36. The method of any of paragraphs A1-A35, wherein the computing includes computing plurality of thickness differences, each corresponding to a point within the inspection area, a region within the inspection area, and/or the entire inspection area.

A36.1. The method of paragraph A36, wherein the points and/or the regions are arranged in at least one of an array, a grid, and a mesh.

A37. The method of any of paragraphs A1-A36.1, wherein the computing includes determining the thickness difference between the test 3D profile and the baseline 3D profile.

A38. The method of any of paragraphs A1-A37, wherein the computing includes comparing the thickness difference to a predetermined threshold.

A38.1. The method of paragraph A38, wherein the computing includes computing a plurality of thickness differences and wherein the comparing includes comparing at least one, optionally each, of the thickness differences to the predetermined threshold.

A39. The method of any of paragraphs A1-A38.1, wherein the computing includes determining that the thickness difference is greater than, equal to, substantially equal to, and/or less than a predetermined threshold.

A40. The method of any of paragraphs A1-A39, wherein a/the predetermined threshold is greater than 0.01 mm, greater than 0.02 mm, greater than 0.05 mm, greater than 0.1 mm, greater than 0.2 mm, greater than 0.5 mm, greater than 1 mm, greater than 2 mm, greater than 5 mm, less than 0.05 mm, less than 0.1 mm, less than 0.2 mm, less than 0.5 mm, less than 1 mm, less than 2 mm, less than 5 mm, less than 10 mm, about 3 mm, about 6 mm, and/or about 10 mm.

A41. The method of any of paragraphs A1-A40, further comprising, upon determining that the thickness difference is greater than, equal to, substantially equal to, and/or less than a predetermined threshold, alerting an inspector of an inter-laminal void formation.

A42. The method of any of paragraphs A1-A41, further comprising, upon determining that the thickness difference is greater than, equal to, and/or substantially equal to a predetermined threshold, compacting the uncured fiber piece onto the form.

A42.1. The method of paragraph A42, wherein the compacting includes vacuum bagging and/or compressing the uncured fiber piece onto the form.

A43. The method of any of paragraphs A1-A42.1, further comprising, upon determining that the thickness difference is greater than, equal to, substantially equal to, and/or less than a predetermined threshold, heating the uncured fiber piece.

A43.1. The method of paragraph A43, wherein the heating is to a temperature less than a cure temperature of the uncured fiber piece.

A43.2. The method of any of paragraphs A43-A43.1, wherein the heating is to a temperature less than 40° C., less than 50° C., less than 70° C., less than 100° C., less than 120° C., less than 150° C., less than 175° C., greater than 30° C., greater than 40° C., greater than 50° C., and/or greater than 70° C.

A44. A non-transitory computer-readable medium storing instructions for a computing system to perform the method of any of paragraphs A1-A43.2.

B1. A system for inspecting an uncured fiber-reinforced composite, the system comprising:
a light projector configured to project light patterns onto an inspection area on a form;
a digital camera configured to image light patterns on the form; and
a computing system programmed to:
project a first light pattern onto the inspection area on the form with the light projector;
acquire at least two baseline images of the first light pattern on the form, wherein at least one of the two, optionally all of the, baseline images is acquired with the digital camera;
determine a baseline 3D profile of the form from the baseline images;
project a second light pattern onto the uncured fiber-reinforced composite layered on the form within the inspection area;
acquire at least two test images of the second light pattern on the uncured fiber-reinforced composite layered on the form, wherein at least one of the two, optionally all of the, test images is acquired with the digital camera;
determine a test 3D profile of the uncured fiber-reinforced composite layered on the form from the test images; and
determine a thickness difference between the test 3D profile and the baseline 3D profile.

B1.1. The system of paragraph B1, wherein the first light pattern and the second light pattern are the same.

B1.2. The system of any of paragraphs B1-B1.1, wherein the first light pattern is related to the second light pattern in a deterministic manner.

B2. The system of any of paragraphs B1-B1.2, wherein the computing system is programmed to perform the method of any of paragraphs A1-A43.2.

B3. The system of any of paragraphs B1-B2, further comprising the form.

B3.1. The system of paragraph B3, wherein the form includes, and optionally is, at least one of a mandrel, a mold, a tool, and a ply of uncured fiber pieces.

B3.2. The system of any of paragraphs B3-B3.1, wherein the form is configured to facilitate fabrication of at least a portion of at least one of an aircraft, an airframe, a fuselage, a wing, an aerospace structure, an airfoil, a rotor blade, a wind turbine structure, an automotive structure, and a watercraft structure.

B4. The system of any of paragraphs B1-B3.2, wherein the light projector includes at least one of a lamp, an LED, a laser, a diffractive beam splitter, a diffractive optic, and a laser scanner.

B5. The system of any of paragraphs B1-B4, wherein the first light pattern and/or the second light pattern is a high contrast pattern.

B6. The system of any of paragraphs B1-B5, wherein the first light pattern and/or the second light pattern is a regular pattern, a non-regular pattern, and/or a stochastic pattern.

B7. The system of any of paragraphs B1-B6, wherein the first light pattern and/or the second light pattern is at least one of an array of spots, a grid, an image, a repeating pattern, and a two-dimensionally repeating pattern.

B8. The system of any of paragraphs B1-B7, wherein the first light pattern and/or the second light pattern includes bright patches bounded by dim patches.

B8.1. The system of paragraph B8, wherein an average minor dimension of the bright patches and/or an average minor dimension of the dim patches is less than 12 mm, less than 10 mm, less than 7 mm, less than 5 mm, less than 3 mm, less than 2 mm, less than 1 mm, greater than 1 mm, greater than 2 mm, greater than 3 mm, greater than 5 mm, greater than 7 mm, greater than 10 mm, and/or greater than 12 mm.

B8.2. The system of any of paragraphs B8-B8.1, wherein an average minor dimension of the bright patches and/or an average minor dimension of the dim patches is less than a width of an uncured fiber piece of the uncured fiber-reinforced composite.

B8.3. The system of any of paragraphs B8-B8.2, wherein the bright patches include a first color and the dim patches include a second color.

B9. The system of any of paragraphs B1-B8.3, wherein the digital camera is a first digital camera, and the system further comprises a second digital camera configured to image light patterns on the form.

B9.1. The system of paragraph B9, wherein first digital camera and the second digital camera have different perspectives of the form.

B9.2. The system of any of paragraphs B9-B9.1, wherein the computing system is programmed to acquire at least one baseline image with the first digital camera and at least one baseline image with the second digital camera, and optionally to acquire the baseline images at least partially concurrently.

B9.3. The system of any of paragraphs B9-B9.2, wherein the computing system is programmed to acquire at least one test image with the first digital camera and at least one test image with the second digital camera, and optionally to acquire the test images at least partially concurrently.

B9.4. The system of any of paragraphs B9-B9.3, wherein the first digital camera and the second digital camera are configured to at least partially concurrently image the form.

B10. The system of any of paragraphs B1-B9.4, further comprising a stage configured to repeatably change the perspective of the digital camera between at least two positions.

B11. The system of any of paragraphs B1-B10, wherein the computing system is programmed to determine the baseline 3D profile and/or to determine the test 3D profile by performing at least one of full-field 3D image correlation, digital image correlation, photogrammetry, and triangulation.

B12. The system of any of paragraphs B1-B11, wherein the computing system is programmed to determine the baseline 3D profile by correlating, and/or calculating a correlation coefficient of, the baseline images.

B13. The system of any of paragraphs B1-B12, wherein the computing system is programmed to determine the test 3D profile by correlating, and/or calculating a correlation coefficient of, the test images.

B14. The system of any of paragraphs B1-B13, further comprising an automated fiber-placement machine and wherein the computing system is configured to direct the automated fiber-placement machine to layer the uncured fiber-reinforced composite onto the form.

B15. The system of any of paragraphs B1-B14, wherein the uncured fiber-reinforced composite is at least one of a fiber piece, a fiber strip, a fiber sheet, a fiber tow, a band, a course, a layer, a lamina, and a ply.

B16. The system of any of paragraphs B1-B15, wherein the uncured fiber-reinforced composite includes an uncured fiber material and/or a prepreg fiber material.

B17. The system of any of paragraphs B1-B16, wherein the uncured fiber-reinforced composite includes at least one of carbon fiber, glass fiber, polyamide fiber, epoxy, a thermoplastic material, and a thermoset material.

B18. The use of the system of any of paragraphs B1-B17 to inspect uncured fiber-reinforced composite components.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function. Further, as used herein, the singular forms "a", "an" and "the" may be intended to include the plural forms as well, unless the context clearly indicates otherwise.

The various disclosed elements of systems and steps of methods disclosed herein are not required of all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

The invention claimed is:

1. An inspection method comprising:
    projecting a light pattern onto an inspection area on a form;
    acquiring a baseline 3D profile of the form by imaging the light pattern on the form from different perspectives and performing digital image correlation with images of the form from the different perspectives;
    laying an uncured fiber piece onto the form within the inspection area;
    projecting the light pattern onto the uncured fiber piece on the form;
    acquiring a test 3D profile of the uncured fiber piece on the form by imaging the light pattern on the uncured fiber piece on the form from the different perspectives and performing digital image correlation with images of the uncured fiber piece from the different perspectives; and
    computing a thickness difference between the test 3D profile and the baseline 3D profile.

2. The inspection method of claim 1, wherein the acquiring the baseline 3D profile and the acquiring the test 3D profile include performing full-field 3D image correlation.

3. The inspection method of claim 1, further comprising detecting a void between the uncured fiber piece and the form.

4. The inspection method of claim 1, further comprising detecting no void between the uncured fiber piece and the form.

5. The inspection method of claim 1, wherein the light pattern includes bright patches bounded by dim patches.

6. The inspection method of claim 1, wherein the projecting the light pattern onto the form includes focusing an image of the light pattern on the form, and wherein the projecting the light pattern onto the uncured fiber piece on the form includes focusing an image of the light pattern on the uncured fiber piece on the form.

7. The inspection method of claim 1, wherein the images form from the different perspectives include at least two baseline images of the light pattern on the form, and wherein the images of the uncured fiber piece from the different perspectives include at least two test images of the light pattern on the form.

8. The inspection method of claim 1, wherein the acquiring the baseline 3D profile includes substantially simultaneously imaging, with at least two digital cameras with the different perspectives, the light pattern on the form, and wherein the acquiring the test 3D profile includes substantially simultaneously imaging, with the at least two digital cameras, the light pattern on the uncured fiber piece on the form.

9. The inspection method of claim 1, wherein the images of the form from the different perspectives include a first image of the light pattern on the form from a first perspective and a second image of the light pattern on the form from a second perspective, and wherein the images of the uncured fiber piece from the different perspectives include a third image of the light pattern on the uncured fiber piece on the form from the first perspective a fourth image of the light pattern on the uncured fiber piece on the form from the second perspective.

10. The inspection method of claim 1, wherein the laying includes laying a plurality of uncured fiber pieces in a single layer on the form.

11. The inspection method of claim 1, wherein the uncured fiber piece is one of a series of uncured fiber pieces, and the method further comprises layering the series of uncured fiber pieces onto the form.

12. The inspection method of claim 11, wherein the layering includes forming a first layer including at least one of the series of uncured fiber pieces and forming a second layer contacting the first layer, wherein the second layer includes at least one of the series of uncured fiber pieces.

13. The inspection method of claim 11, further comprising, upon determining that the thickness difference is greater than a predetermined threshold, ceasing the layering.

14. The inspection method of claim 1, wherein the computing includes computing a plurality of thickness differences between the test 3D profile and the baseline 3D profile, each thickness difference corresponding to a point within the inspection area.

15. The inspection method of claim 1, wherein the computing includes determining that the thickness difference is greater than a predetermined threshold, wherein the predetermined threshold is less than 10 mm.

16. The inspection method of claim 1, further comprising, upon determining that the thickness difference is greater than a predetermined threshold, compacting the uncured fiber piece onto the form.

17. The inspection method of claim 1, further comprising, upon determining that the thickness difference is greater than a predetermined threshold, heating the uncured fiber piece.

18. A non-transitory computer-readable medium storing instructions for a computing system to perform the method of claim 1.

19. An inspection method comprising:
projecting a light pattern onto an inspection area on a form;
acquiring a baseline 3D profile of the form by imaging the light pattern on the form, wherein the imaging includes substantially simultaneously acquiring at least two baseline images of the light pattern on the form, and wherein the acquiring the baseline 3D profile includes computing, by digital image correlation, the baseline 3D profile of the form from the baseline images;
laying an uncured fiber piece onto the form within the inspection area;
projecting the light pattern onto the uncured fiber piece on the form;
acquiring a test 3D profile of the uncured fiber piece on the form by imaging the light pattern on the uncured fiber piece on the form, wherein the imaging includes substantially simultaneously acquiring at least two test images of the light pattern on the form, and wherein the acquiring the test 3D profile includes computing, by digital image correlation, the test 3D profile of the form from the test images; and
computing a thickness difference between the test 3D profile and the baseline 3D profile;
wherein the computing includes comparing the thickness difference to a predetermined threshold that is less than 10 mm.

20. A system for inspecting an uncured fiber-reinforced composite, the system comprising:
a light projector configured to project a light pattern onto an inspection area on a form;
a digital camera configured to image the light pattern on the form; and
a computing system programmed to:
project the light pattern onto the inspection area on the form with the light projector;
acquire at least two baseline images of the light pattern on the form, wherein at least one of the two baseline images is acquired with the digital camera;
determine a baseline 3D profile of the form from the baseline images by performing digital image correlation;
project the light pattern onto the uncured fiber-reinforced composite layered on the form within the inspection area;
acquire at least two test images of the light pattern on the uncured fiber-reinforced composite layered on the form, wherein at least one of the two test images is acquired with the digital camera;
determine a test 3D profile of the uncured fiber-reinforced composite layered on the form from the test images by performing digital image correlation; and
determine a thickness difference between the test 3D profile and the baseline 3D profile.

* * * * *

UNITED STATES PATENT AND TRADEMARK OFFICE
CERTIFICATE OF CORRECTION

PATENT NO. : 9,759,547 B2
APPLICATION NO. : 14/463433
DATED : September 12, 2017
INVENTOR(S) : James A. Grossnickle et al.

It is certified that error appears in the above-identified patent and that said Letters Patent is hereby corrected as shown below:

In the Claims

Claim 7, Column 16, Lines 9 - 10, add --of the-- after "images" and before "form".

Claim 9, Column 16, Lines 30, add --and-- after "perspective" and before "a".

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*